(12) United States Patent
Ott

(10) Patent No.: US 6,296,236 B1
(45) Date of Patent: Oct. 2, 2001

(54) ELASTIC SUSPENSION FOR A HYDRAULIC UNIT IN A MOTOR VEHICLE BRAKING SYSTEM

(75) Inventor: Harald Ott, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/230,803

(22) PCT Filed: Feb. 21, 1998

(86) PCT No.: PCT/DE98/00530

§ 371 Date: May 28, 1999

§ 102(e) Date: May 28, 1999

(87) PCT Pub. No.: WO98/56629

PCT Pub. Date: Dec. 17, 1998

(30) Foreign Application Priority Data

Jun. 9, 1997 (DE) ............................................. 197 24 177

(51) Int. Cl.[7] ................. F16F 13/00; F16M 7/00
(52) U.S. Cl. .................. 267/140.11; 248/638; 303/113
(58) Field of Search ................. 267/140.11; 248/603, 248/638, 647, 609, 674, 673, 316.1, 224.3, 222.11, 222.12, 220.21, 671, 681; 188/72.1, 72.4, 73.35, 73.36, 73.42, 73.43

(56) References Cited

U.S. PATENT DOCUMENTS

| | | | |
|---|---|---|---|
| 1,551,516 | * | 8/1925 | McGovern . |
| 4,618,114 | * | 10/1986 | McFarland ............................. 248/65 |
| 5,066,076 | * | 11/1991 | Troster ................................. 303/113 |
| 5,104,072 | * | 4/1992 | Kuo ..................................... 248/68.1 |
| 5,195,717 | * | 3/1993 | Benz .................................... 248/638 |
| 5,588,375 | * | 12/1996 | Cotterill ............................... 108/102 |
| 5,658,056 | * | 8/1997 | Rischen ............................. 303/119.2 |
| 5,850,996 | * | 12/1998 | Liang ............................... 248/221.11 |

FOREIGN PATENT DOCUMENTS

| | | |
|---|---|---|
| 0 456 991 B1 | 11/1991 | (EP) . |
| 0 699 571 A1 | 6/1996 | (EP) . |

* cited by examiner

*Primary Examiner*—J. J. Swann
*Assistant Examiner*—David Divine
(74) *Attorney, Agent, or Firm*—Ronald E. Greigg; Edwin E. Greigg

(57) ABSTRACT

An elastic bearing of a hydraulic subassembly of a vehicle brake system including at least two rubber elastic support elements that isolate vibrations and are embodied in the form of hollow cylinders into which pins leading from the hydraulic subassembly protrude. The pins are aligned essentially horizontally and wherein the rubber elastic elements are inserted into lower partial bearing or support shells and are prevented from coming out of the lower partial bearing or support shells by upper partial bearing or securing shells. The upper partial bearing or securing shells are aligned axially parallel to the rubber elastic elements and are then to be slid over the rubber elastic elements. In order to facilitate mounting, the upper partial bearing or securing shells are designed so that they can be mounted from above, and thereby essentially radially with respect to the rubber elastic elements. A bracket leads from the upper partial bearing or securing shell, and by means of a pivotal movement, the bracket engages under a portion of the lower partial bearing or support shell in order to hold the upper partial bearing or support bracket in place and thus securely encompass the rubber elastic element.

19 Claims, 11 Drawing Sheets

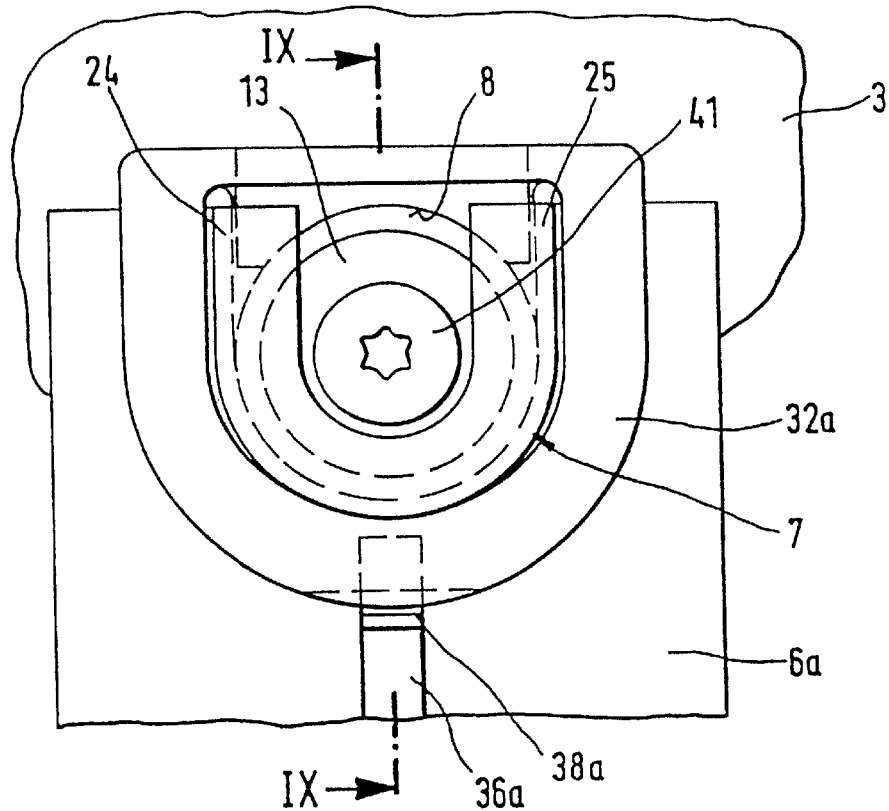
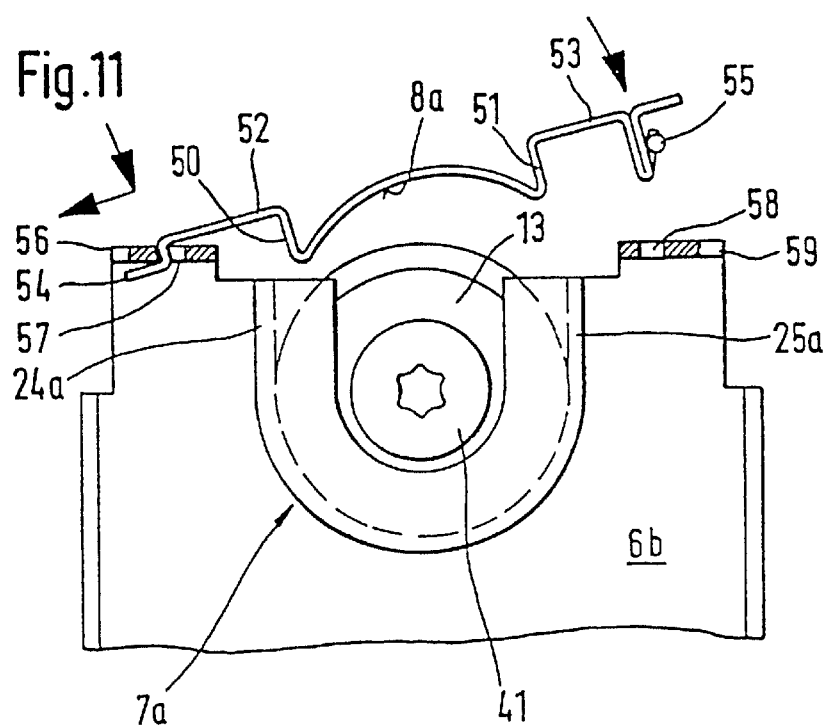

ELASTIC SUSPENSION FOR A HYDRAULIC UNIT IN A MOTOR VEHICLE BRAKING SYSTEM

The invention is based on an elastic bearing of a hydraulic subassembly of a vehicle brake system.

The reference EP 0 456 991 B1 has disclosed an elastic bearing of a hydraulic subassembly, which is used, for example, for a wheel brake slip limitation, a drive slip limitation through the braking of wheels that can be driven, or through another type of automatic braking such as braking to produce yawing moments for the purpose of improving the driving behavior of a vehicle. The elastic bearing is comprised of three rubber elastic elements in the form of hollow cylindrical components, three pins that project from the subassembly, extend into the rubber elastic elements, and are aligned lying parallel in an essentially horizontal plane, as well as a bracket with two vertically protruding support arms and, formed onto these, lower partial shells into which the rubber elastic elements are inserted at least halfway, and stationary upper partial bearing shells, which cover over the rubber elastic elements. In order to fix the upper partial bearing shells in relation to the lower partial bearing shells, the upper partial bearing shells are embodied in the form of disk pieces that are aligned in relation to the lower partial bearing shells along their longitudinal axes and are slid over the rubber elastic elements. To this end, U-guide profiles that are aligned axially parallel can be formed onto the upper partial bearing shells and these U-guide profiles grasp guide arms that protrude from the lower partial bearing shells. In the circumference direction of the upper partial bearing shells, another exemplary embodiment has continuations that are closed into a tube so that when the essentially tubular components are slid on along the lower partial bearing shells and along the rubber-like elastic elements, both these rubber-like elastic elements and the lower partial bearing shells are encompassed in ring fashion. It is clear that the more difficult it is to slide the upper partial bearing shells on and to slide them along over the rubber elastic elements, the tighter the rubber elastic elements have to be grasped by the partial bearing shells.

The reference EP 0 699 571 A1 has disclosed another elastic bearing of a hydraulic subassembly of a vehicle brake system. This elastic bearing has three rubber elastic elements that are embodied essentially as hollow cylinders, which are slid into blind holes of the hydraulic subassembly, wherein two of the blind holes are disposed on opposite sides of the hydraulic subassembly and a third, essentially vertically aligned blind hole can be let into an underside of the hydraulic subassembly.

ADVANTAGES OF THE INVENTION

The elastic bearing of a hydraulic subassembly of a vehicle brake system has the advantage that upper partial bearing shells can be conveniently mounted in essentially the same mounting direction as the hydraulic subassembly in relation to the support arms. As a result, the upper partial bearing shells can be mounted and pressed essentially radial to the rubber elastic elements. This mounting direction practically prevents axial relative movements of the upper partial bearing shells in relation to the rubber elastic elements so that sliding forces that serve to overcome friction forces are avoided.

The improvements herein produce the advantage of a mechanical alignment of the upper partial bearing shells relative to the lower partial bearing shells before the upper partial bearing shells are pressed against the rubber elastic elements.

The improvements herein yield inexpensively producible fixing means which are used to fix the position of the upper partial bearing shells relative to the lower partial bearing shells. The improvements herein produce an exemplary embodiment for the upper partial bearing shells made of metal, wherein this kind of metal upper bearing shells can be manufactured using a known stamping and bending technique. Other improvements disclose an example of the manner in which the detent projections can be associated with the upper partial bearing shells. Still other improvements produce a suitable exemplary embodiment of how the detent projections can be manufactured using the stamping and bending technique. Further improvements produce a further exemplary embodiment for the association of at least one detent projection with an upper partial bearing shell. In this exemplary embodiment, the mounting of the upper partial bearing shell begins with a hooking-in so that when pressing the upper partial bearing shell against a rubber-like element, an assembler merely has to monitor the snapping-in of a detent projection into a detent opening.

The improved features assume the advantage with regard to the strength of a fixing, which advantage results from the grasping of lower partial bearing shells, with the advantage of the essentially radial mounting direction of the upper partial bearing shells according to the invention. When the upper partial bearing shells are brought toward the rubber elastic elements or the lower partial bearing shells, the upper partial bearing shells are aligned at a slight angle so that the fixing brackets can be lowered in relation to the lower partial bearing shells and finally, can be pivoted under the lower partial bearing shells by pressing the rubber elastic elements together. The features set forth herein disclose an exemplary embodiment for fixing the position of the fixing bracket so that it remains in the fixed position. The exemplary embodiment can be manufactured in a technically inexpensive manner as a one-piece thermoplastic component. Other features set forth herein disclose another exemplary embodiment in which the positional fixing of the fixing bracket takes place by means of a tab and a detent projection, which are disposed on the respective support arm.

Different features set forth herein make use of the elasticity of a thermoplastic material from which the fixing brackets can be manufactured, by means of which the fixing bracket and an elastically resilient detent projection can be produced at the same time and therefore inexpensively.

Still different features produce a captive attachment of the two rubber elastic elements to the sides of the hydraulic subassembly with the advantage that a hydraulic subassembly of this kind can be manufactured with the rubber elastic elements on an assembly line and is consequently prepared for installation in a vehicle at a distant location.

BRIEF DESCRIPTION OF THE DRAWINGS

A number of exemplary embodiments of the invention are shown in the drawings and will be explained in more detail in the description below.

FIGS. 11 to 14 show another exemplary embodiment for the manufacture from a spring steel sheet in different mounting stages.

DESCRIPTION OF THE EXEMPLARY EMBODIMENTS

Figure 1:
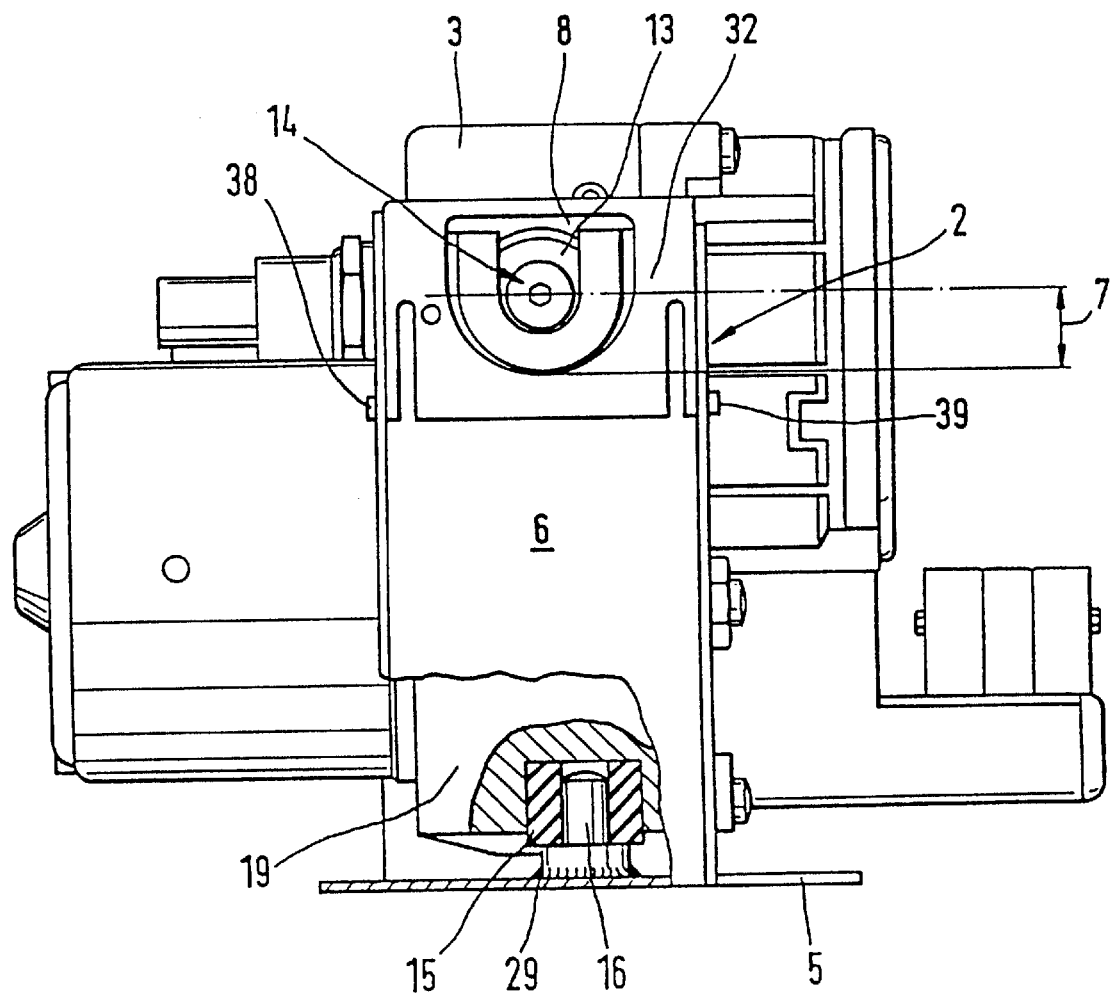
FIG. 1 is a side view of a first exemplary embodiment according to the invention of an elastic bearing of a hydraulic subassembly.
Figure 2:
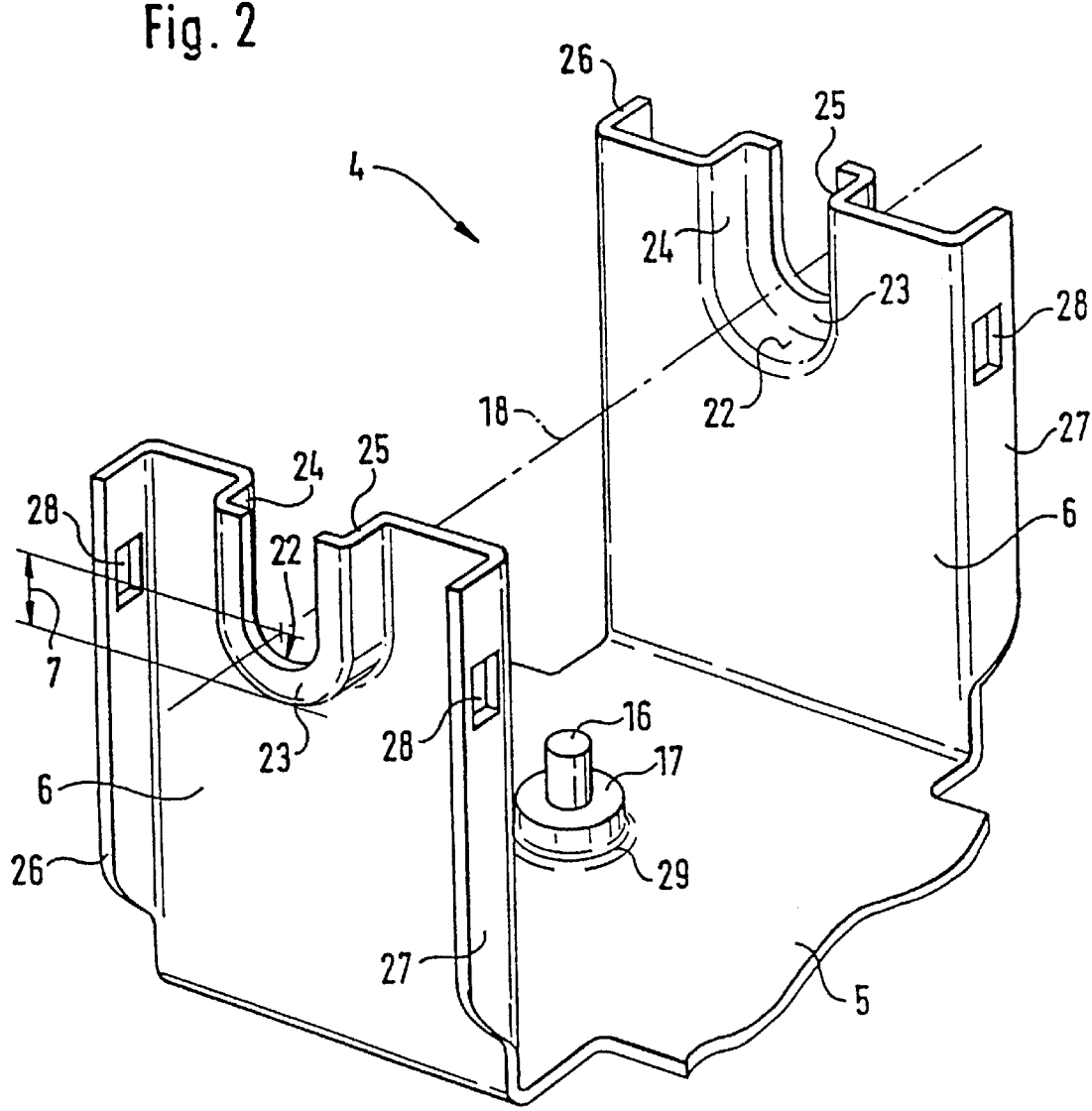
FIG. 2 is an oblique view of a component of the elastic bearing according to FIG. 1, FIGS. 3, 4, 5, and 6 show various views of another component of the elastic bearing.

The first exemplary embodiment of an elastic bearing 2 according to FIGS. 1 and 2 for a hydraulic subassembly 3 includes a bracket 4, which, as a formed sheet metal part, has a base plate 5 and support arms 6 that protrude essentially vertically upward from the base plate, two lower partial bearing shells 7 formed onto the support arms 6, two upper partial bearing shells 8, two rubber elastic elements 13 associated with the partial bearing shells 7, 8, pins 14 associated with the rubber elastic elements 13, another rubber elastic element 15, another pin 16, and between this pin 16 and the base plate 5, for example, a support column 17.

Figure 7:
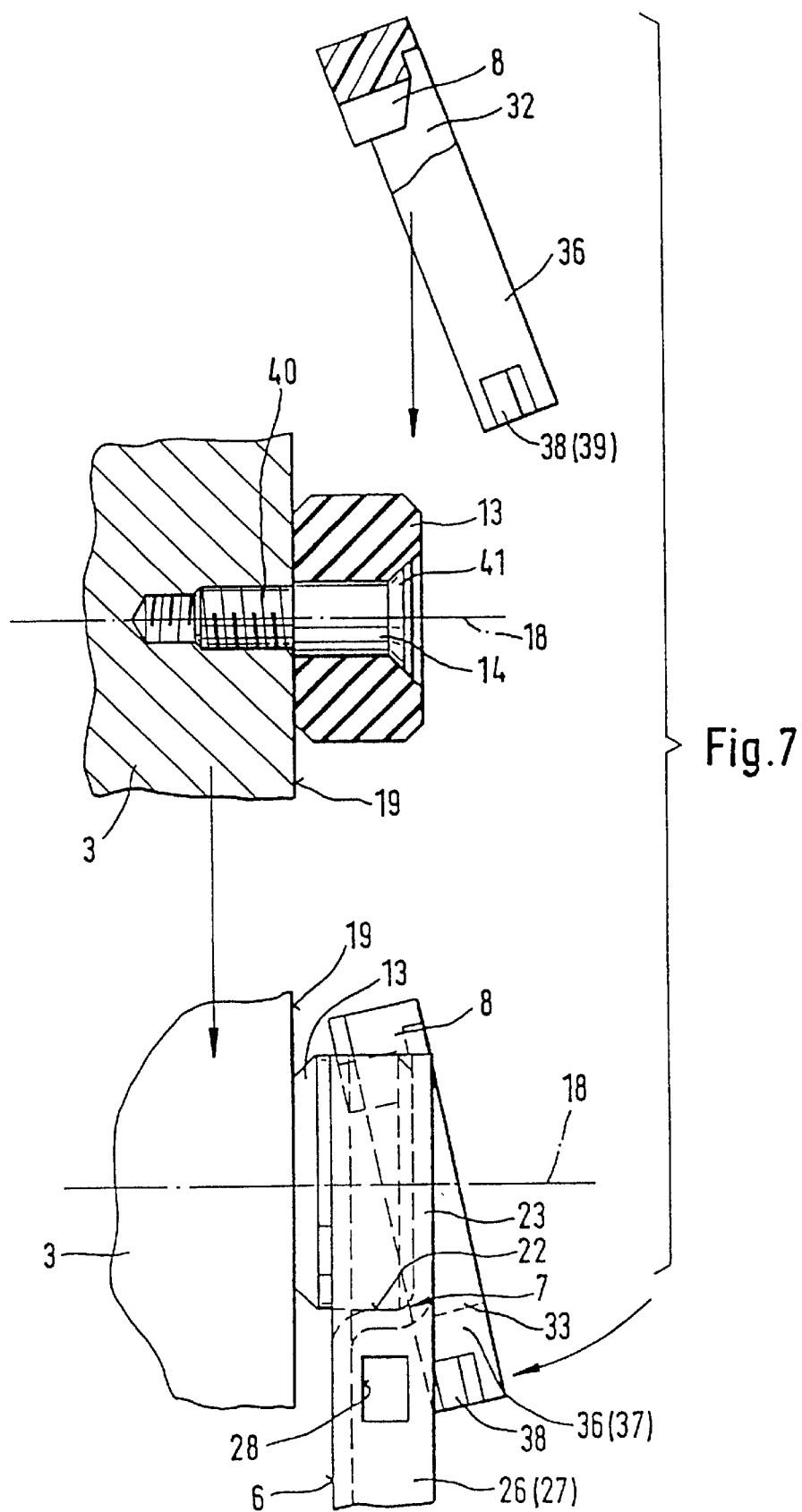
FIG. 7 shows mounting steps of the components from the elastic bearing according to FIG. 1, FIGS. 8 to 10 show another exemplary embodiment in two different mounting stages and completely mounted in the side view.

The hydraulic subassembly 3 is embodied, for example, according to the reference EP 0 699 571 A1, with the exception of the disposition of the two rubber elastic elements 13, which are disposed on two opposing sides of the hydraulic subassembly and as a result, lie on a common axis 18, which is indicated in FIG. 2, and wherein the hydraulic subassembly 3 has smooth faces 19 oriented toward the support arms 6, as indicated in FIG. 7, in the vicinity of the two pins 14. Alternatively, however, the hydraulic subassembly 3 can also have a different internal structure than that described in the reference EP 0 699 571 A1.

As can best be seen in FIG. 2, the lower partial bearing shells 7 are comprised of semi-cylindrical partial surfaces 22 that are curved around the axis 18 and, toward the end faces and thereby lateral to the axis 18, are associated with basal flanges 23 that serve as axial stops for the rubber elastic elements 13. Above the lower partial bearing shells 7, extensions 24, 25 extend in pairs essentially vertically and therefore parallel to each other, along which the basal flanges 23 extend upward in an elongated fashion. Running parallel to the extensions 24 and 25, the support arms 6 each have two flanges 26 and 27 that are likewise aligned parallel to each other. The flanges 26 and 27 protrude at right angles from the support arms 6 and thereby point away from the hydraulic subassembly 3 to be suspended between these support arms 6. Detent openings 28, which will be discussed later, are respectively let into the flanges 26 and 27. The pin 16 and the support column 17 are preferably embodied of one piece and can be fastened to the base plate 5, for example by means of a weld 29.

Figure 3:
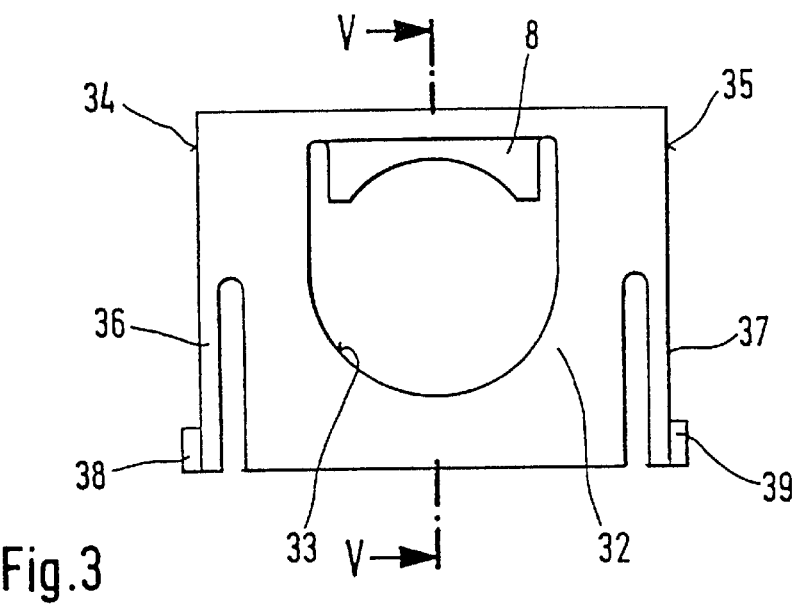
Figure 4:
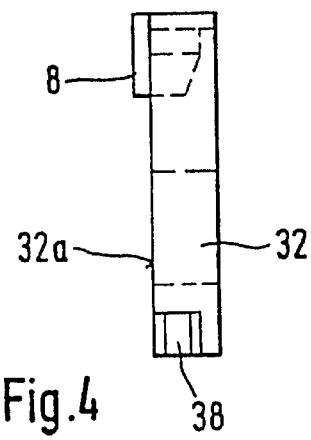
Figure 5:
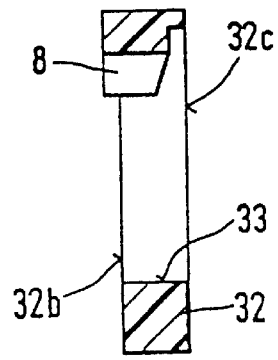
Figure 6:
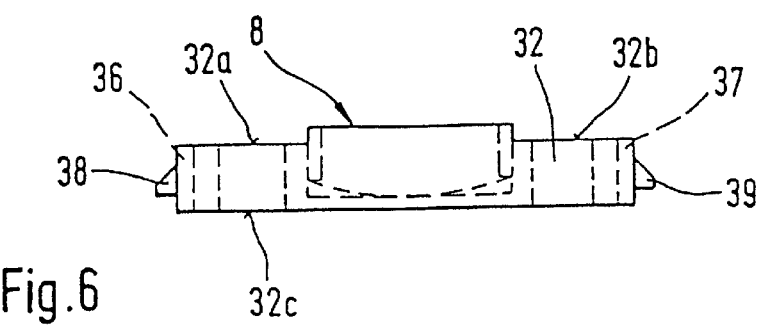

Corresponding to the view according to FIG. 1, an upper partial bearing shell 8 is depicted in FIG. 3, which is adjoined by and of one piece with an essentially U-shaped bracket 32. The essentially U-shaped bracket 32 has a semicircularly curved face section 33, which is designated according to FIG. 1, to extend around and under the lower partial bearing shell 7 and to rest against this partial bearing shell 7 at the deepest point. On both sides and thereby spaced apart from the upper partial bearing shell 8, the essentially U-shaped bracket 32 has two limiting faces 34, 35 that have a distance from each other that is smaller by an insertion play than the clearances of the flanges 26 and 27 that are associated with each other in pairs. Resilient tabs 36 and 37, which have detent projections 38, 39 on their respective free ends, adjoin along the limiting faces 34 and 35. As is best shown in FIG. 6, a top view of the upper partial bearing shell 8 and the bracket 32, the detent projections are formed in such a way that once again with reference to FIG. 6, a movement of the tabs 36 and 37 upward in the plane of the drawing is a movement direction for the detent engagement of the detent projections 38 and 39 in the detent openings 28 of the flanges 26 and 27. With regard to FIG. 6, the upper partial bearing shell 8 constitutes a step in relation to the delimitation 32a and 32b. The size of this shoulder or this step essentially corresponds to the thickness of a metal sheet from which the support arms 6 are formed. On the other hand, as can best be seen in FIG. 5, the upper partial bearing shell 8 is set back in relation to a limiting face 32c disposed opposite one of the limiting faces 32a and 32b, wherein this setback in turn corresponds, for example, to the thickness of the metal sheet from which the support arms are formed. Consequently, the magnitude of the setback also essentially corresponds to the thickness of the basal flange 23. A support arm 6 with a lower partial bearing shell 7 is depicted at the bottom in FIG. 7. A detail of a hydraulic subassembly 3 is depicted above this and a rubber elastic element 13 is fixed to the smooth limiting face 19 of this hydraulic subassembly by means of a pin 14, which is screwed into the hydraulic subassembly 3 by means of a thread 40, wherein a conical head 41 keeps the rubber elastic element 13 from becoming lost. The upper partial bearing shell 8, together with the bracket 32, is depicted in an angular alignment relative to the smooth face 19 of the subassembly 3, at a distance above the rubber elastic element 13.

The mounting is now carried out as follows:

The hydraulic subassembly is lowered between two support arms 6, wherein the two rubber elastic elements are guided between the extensions 24 and 25 and are inserted into the lower partial bearing shells 7. The rubber elastic element 15 is also slid over the pin 16. For example, after this, the rubber elastic element 15 can rest on the support column 17. This finishes a first mounting step. As two further mounting steps, this is followed by the alignment of the upper partial bearing shells 8 according to FIG. 7 in the angular positions including the lowering onto the respective rubber elastic element 13, wherein each upper partial bearing shell 8 is inserted between the extensions 24 and 25 along the basal flange 23 that is elongated upward. As can be seen in FIG. 7, the detent projections 38, 39 have their positions outside the flanges 26 and 27. By pivoting the bracket 32 with the resilient tabs 36, 37 between the flanges 26 and 27, the tabs 36 and 37 flex toward each other, the detent projections 38, 39 are disposed between the two flanges 26 and 27 so that with further pivoting movement, these detent projections 38, 39 come into alignment with the detent openings 28 and as a result of the elasticity of the resilient tabs 36 and 37, snap into these detent openings. This finishes the mounting, together with the securing of the hydraulic subassembly 3.

It is clear that the suspension of the hydraulic subassembly 3 in the lower partial bearing shells 7 of the elastic bearing 2 can be carried out easily, either manually or in an automated fashion. It is furthermore clear that the lowering of the upper partial bearing shell 8 onto a respective rubber elastic element 13, the pressing of this partial bearing shell 8 against or into the rubber elastic element 13, and then the pivoting of the essentially U-shaped bracket 32 toward the respective support arm 6 can be carried out in a relatively simple and therefore inexpensive manner. It is clear that no screw connection has to be produced and secured in the mounting procedures described. In this instance, a securing takes place by means of the previously mentioned detent engagement of the detent projections 38, 39 in the detent openings 28, the results of which can be checked either optically or by feel. During the pivoting of the respective essentially U-shaped bracket 32 toward the respective support arm 6, due to the resistance which can be felt when sliding the curved face section 33 along under the lower partial bearing shell 7, it is clear that the rubber elastic element 13 is grasped tightly enough by the lower partial bearing shell 7 and the upper partial bearing shell 8.

As can be inferred from the reference to the grasping, an elasticity of the elastic bearing lateral to the axis 18 and therefore radial to the rubber elastic elements 13 is determined by means of its deformability relative to the lower partial bearing shells and the upper partial bearing shells. In addition, however, elasticity along the axis 18 also exists by means of the axial contact of the rubber elastic elements 13 against the basal flanges 23, which can best be seen in FIG. 2. The previously known disposition of the third rubber elastic element 15 does not need to be discussed within the scope of the present invention.

Figure 8:
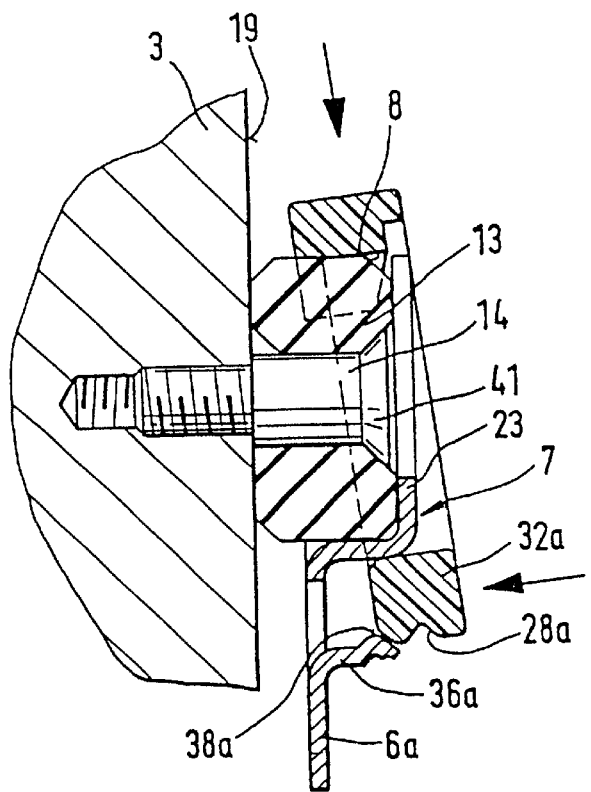
Figure 9:
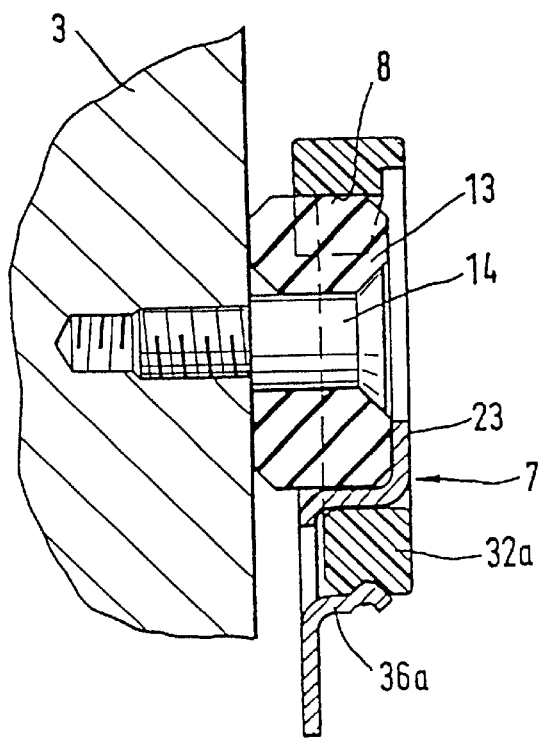

A second exemplary embodiment of the invention according to FIGS. 8 to 10 essentially differs from the exemplary embodiment described first only by virtue of the fact that no resilient tabs, which have detent projections disposed on their ends, lead from an essentially U-shaped bracket 32a that adjoins a respective upper partial bearing shell 8. In lieu of the resilient tabs and detent projections of the first exemplary embodiment, as a replacement for at least one detent opening 28, the bracket 32a has a detent notch 28a at its deepest point. Adapted to this, a respective support arm 6a is provided with a resilient tab 36a and a detent projection 38a formed onto this tab. The resilient tab 36a extends out from the plane of the support arm 6a and essentially parallel to the lower partial bearing shell 7. In this instance, but this is not absolutely required, the support arm 6a is formed out of a metallic sheet so that by producing an essentially U-shaped stamped slit, the resilient tab 36a can be bent out from the plane of the support arm 6a. Before the bending-out, the detent projection 38a can be formed, for example by means of a stamping procedure.

As can best be seen in FIG. 8, the upper partial bearing shell 8 can in turn be lowered onto the rubber elastic element 13 with an essentially U-shaped bracket 32a aligned at an angle to the face 19 of the hydraulic subassembly 3, and can as a result be suspended between vertical extensions 24 and 25, which in turn extend upward from the lower partial bearing shell. For their part, basal flanges 23 are used to axially fix the respective rubber-like element 13.

Figure 12:
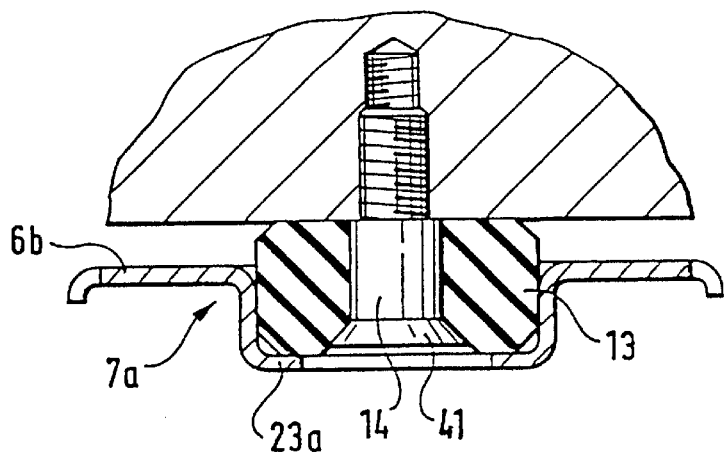
Figure 13:
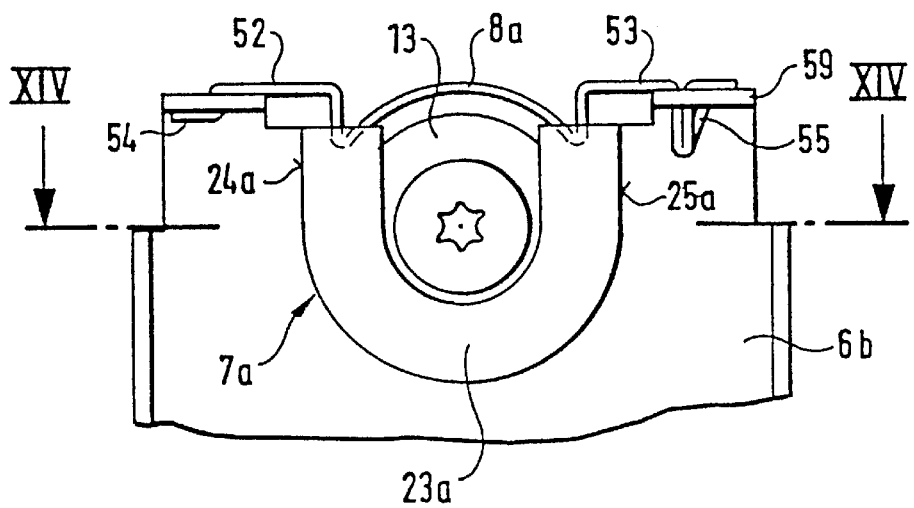
Figure 14:
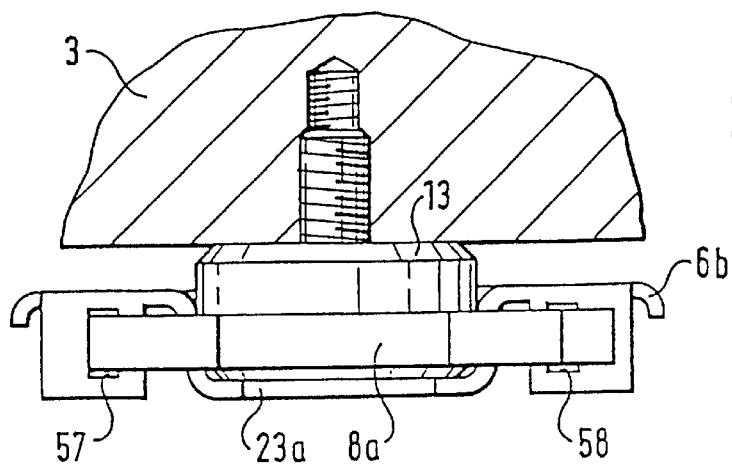

The third exemplary embodiment according to FIGS. 11 to 14 has upper partial bearing shells 8a, which can be bent out from a strip of a metallic spring material. For their part, upper partial bearing shells of this kind can be inserted between two extensions 24a and 25a which lead from the lower partial bearing shells 7a, wherein the lower partial bearing shells 7a respectively lead from a support arm 6b. In order to be inserted between the two extensions 24a and 25a, partial sections 50, 51 that are bent parallel adjoin the respective upper partial bearing shell 8a and leading from them, other partial sections 52 and 53 can extend laterally and thereby in a common plane. A free end of the other partial section 52 is bent in a Z shape and in this manner, forms a hook 54 as a technical equivalent to a detent projection. A free end of the other partial section 53 is folded and also deformed in such a way that a detent projection 55 is situated in connection with the partial section 53. The hook 54 is associated with an opening 57 in a flange 56 that leads from the support arm 6b. This opening 57 constitutes a technical equivalent to the detent openings 28 of the first exemplary embodiment according to FIG. 2. The detent projection 55 is associated with a detent opening 58 which is disposed in a flange 59, which in turn leads from the support arm 6b. FIG. 12 shows a horizontal section through the support arm 6b at the level of the rubber elastic element 13 taken from the first exemplary embodiment. The lower partial bearing shell 7a with the associated basal flange 23a, which bearing shell is indicated in FIG. 11, is in this instance disposed below the intersecting plane mentioned. In FIG. 11, when the end 54 is hooked in, the upper partial bearing shell 8a is spaced vertically apart from the rubber elastic element 13, wherein the detent projection 55 is disposed remote from the detent opening 58. In contrast to this, the upper partial bearing shell 8a in FIG. 13 is shown pivoted downward and pressed down, wherein the detent projection 55 has passed through the detent opening 58 and is supported against the flange 59. This is the final state of the mounting. In this exemplary embodiment, it is particularly easy to see whether the mounting has been carried out correctly and successfully. FIG. 14 is a top view of the mounting result.

It is therefore clear that upper partial bearing shells 8 or 8a can be essentially aligned relative to the rubber-like elements 13 and can be moved in relation to them. As a result, there is no intrinsic significance as to which material the upper partial bearing shells 8a are made of. It is also clear that there is more than one embodiment type for affixing upper partial bearing shells 8 or 8a to support arms 6, 6a, or 6b.

Figure 15:
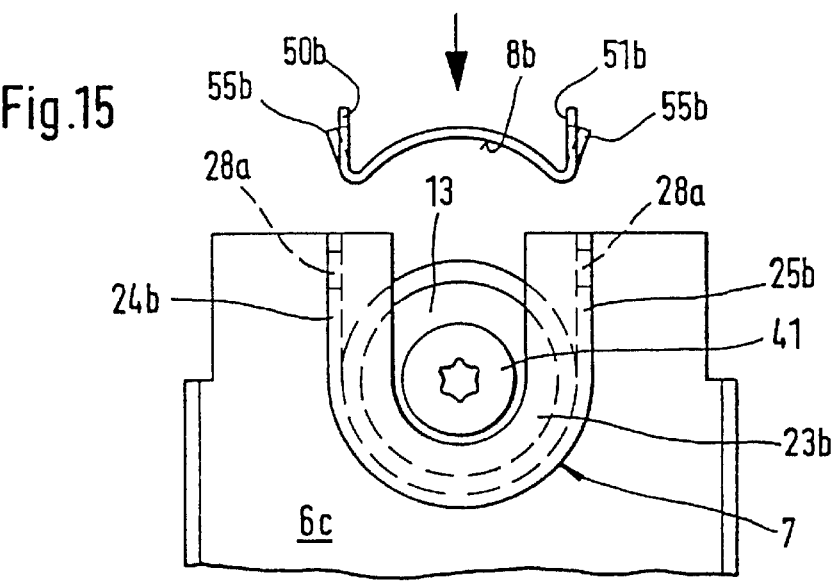
FIGS. 15 to 19 show an alternative exemplary embodiment, which likewise has at least one upper partial bearing shell that can be made of spring steel sheet.
Figure 16:
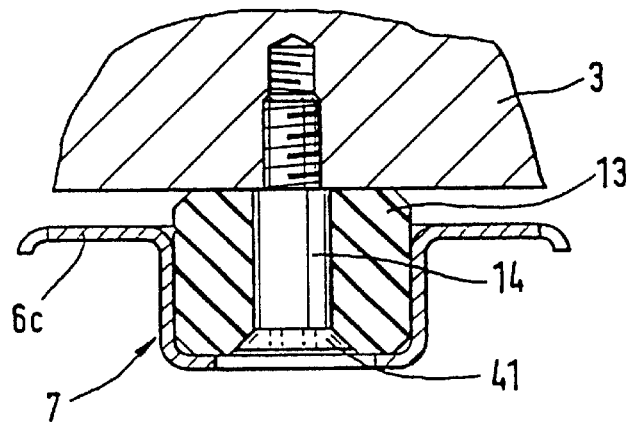
Figure 17:
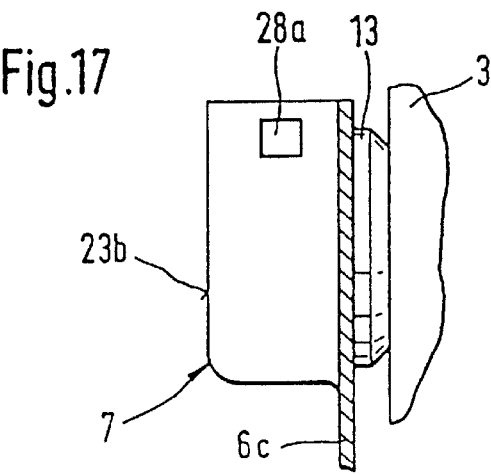
Figure 19:
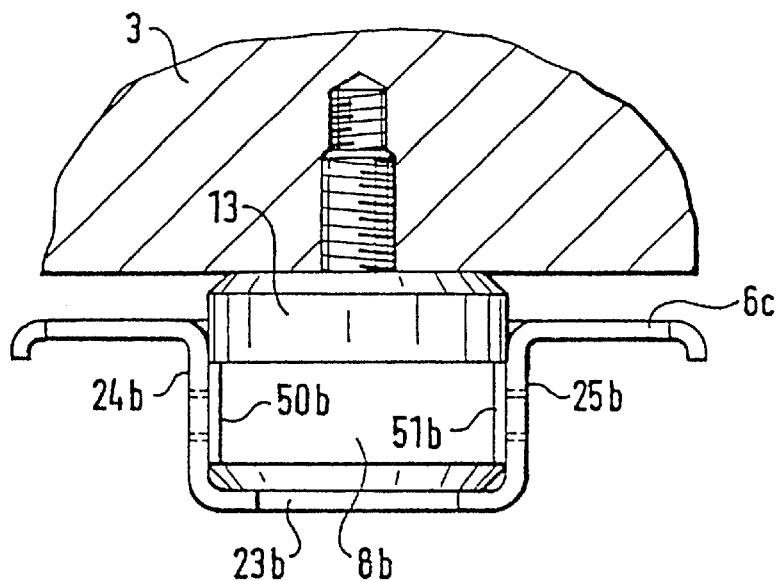
Figure 18:
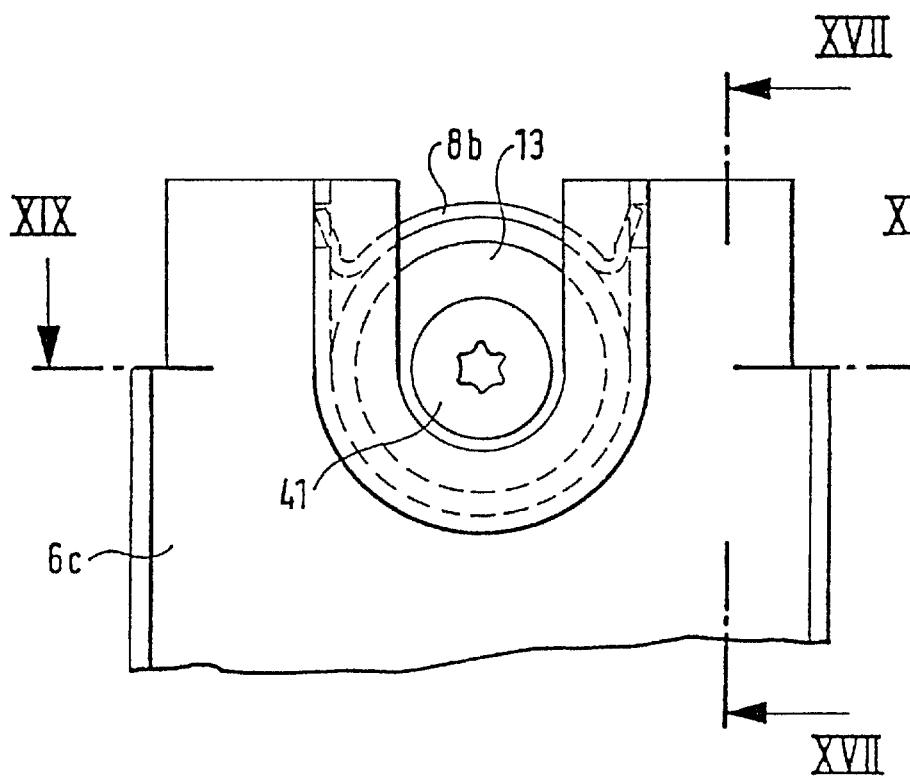

A fourth exemplary embodiment for the elastic bearing is depicted in various mounting states in FIGS. 15 to 18. In a view toward an end face of a rubber elastic element 13, FIG. 15 again shows a support arm 6c with a lower partial bearing shell 7 from which extensions 24b and 25b in turn lead. In contrast to the previously discussed exemplary embodiments, since these extensions 24b and 25b are respectively equipped with a detent opening 28a, the basal flange, which is associated with these extensions 24b and 25b as well as with the lower partial bearing shell 7, is labeled 23b. An upper partial bearing shell 8b is in turn comprised of a metallic spring material, which is used as a starting material, for example in band form. In a manner comparable to the third exemplary embodiment, the upper partial bearing shell 8b, which is curved in accordance with the radius of the rubber elastic element 13, is adjoined by curves and partial sections 50b and 51b directed upward that lead from them. These partial sections 50b and 51b are disposed between the extensions 24b and 25b when the upper partial bearing shell 8b is lowered. In a manner that is not shown, the partial sections 50b and 51b are provided with U-shaped slits so that detent projections 55b can be bent out from the reference plane of these partial sections 50b and 51b and are as a result further apart than a clearance between the extensions 24b and 25b. This can be seen particularly clearly in FIG. 15 since the upper partial bearing shell 8b, which is essential to the invention, is depicted there spaced apart from the support arm 6b. In FIGS. 15 and 16, the rubber elastic element 13 is already supported in the lower partial bearing shell 7. It is therefore only necessary to lower the upper partial bearing shell 8b against the rubber elastic element 13 and to press it together slightly so that the detent projections 55b snap into the detent openings 28a, which is depicted in the final state with dashed lines in FIG. 18. FIG. 19 is a top view of the completely mounted and fixed upper partial bearing shell 8b.

Figure 20:
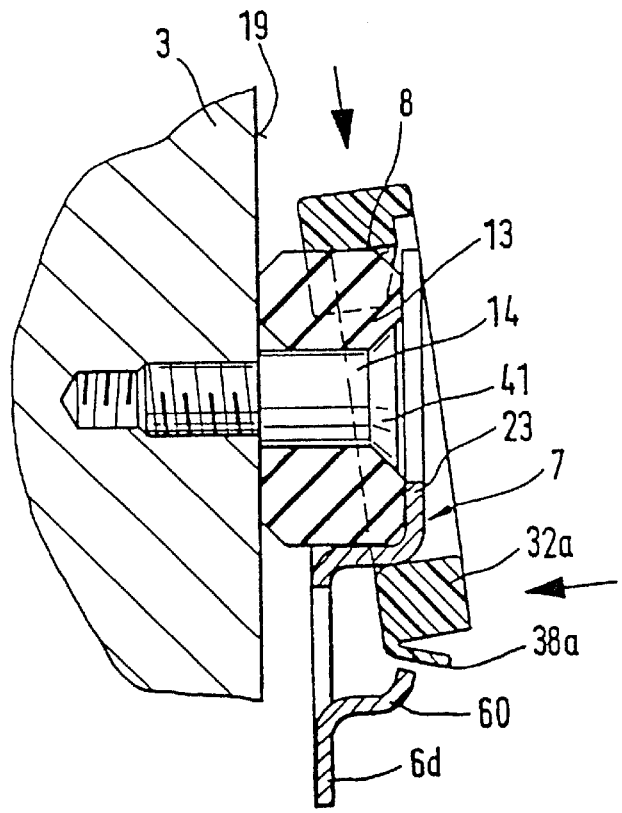
FIGS. 20 to 22 show a fourth exemplary embodiment in two mounting stages.
Figure 21:
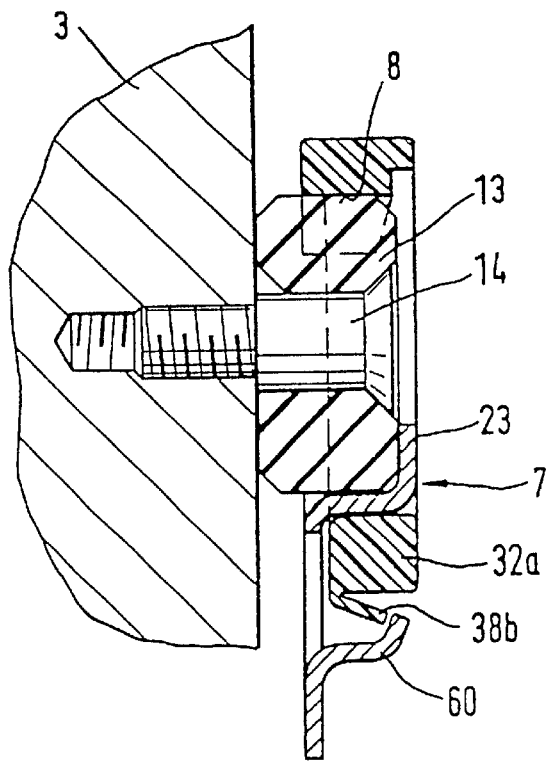
Figure 22:
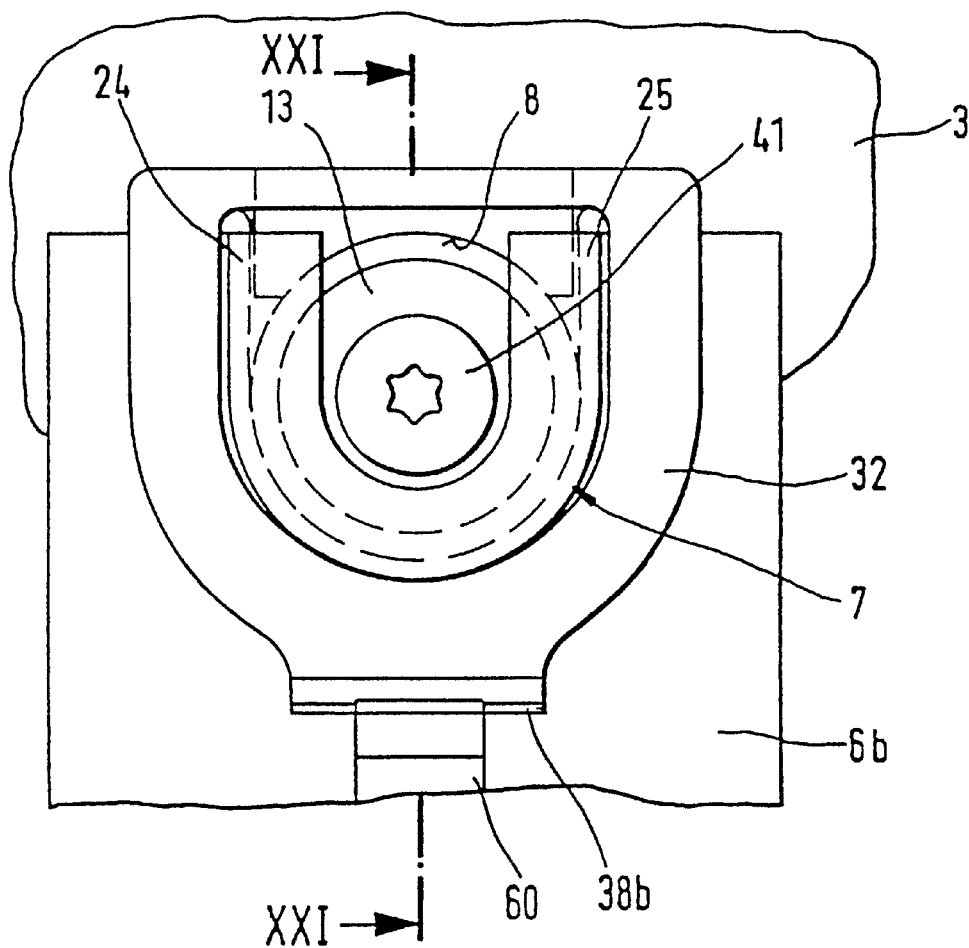

A fifth exemplary embodiment for the elastic bearing is depicted in two different mounting states in FIGS. 20 to 22. The hydraulic subassembly 3, the rubber elastic element 13, and the pin 14 are taken from the exemplary embodiments described above. The upper partial bearing shell 8 is in turn equipped for being placed obliquely onto the rubber elastic element 13 and being subsequently pivoted in such a way that the essentially U-shaped bracket 32b in turn engages around and under the lower partial bearing shell 7 and in this manner, prevents the hydraulic subassembly 3 from moving upward in relation to the lower partial bearing shell 7.

In contrast to the second exemplary embodiment according to FIGS. 8 to 10, the securing of the bracket 32b in position is carried out in relation to the lower partial bearing shell 7. In this instance, a resilient detent projection 38b is formed onto the bracket 32b at its deepest region, wherein the transition from the bracket 32b into the resilient detent projection 38b is disposed on the side of the bracket 32b oriented toward the hydraulic subassembly 3 and consequently, the detent projection 38b is embodied in the form of a resilient tab that points away from the hydraulic subassembly 3, and a free, resilient end of the resilient tab, not shown, is used as the detent projection 38b.

The detent projection 38b is associated with a stationary detent stop 60, beyond which the resilient tab slides by bending elastically when the bracket 32b is pivoted into the final mounting position. If the detent projection 38b passes the detent stop 60, the detent projection 38b springs into the detent position depicted in FIG. 21.

Like the resilient tab 36a and the detent projection 38a which are depicted in FIGS. 8 to 10, the detent stop 60 can be manufactured out of the material or out of a metal sheet from which the support arm 6d is formed, by means of the support arm 6d defining a strip-like region of the metal sheet and by means of bending this strip-like region so that the form depicted in FIG. 20 is produced by means of an essentially S-shaped course of the strip-like region. It is advantageous here that an intrinsically soft deep drawing metal sheet can be used and the elasticity of a thermoplastic material of the bracket 32b is used for the resilient disposition of the detent projection 38b, wherein both the bracket 32b and the detent projection 38b can be produced at the same time in an injection molding tool.

In summary, it can be noted that for purposes of the essentially radial mounting of upper partial bearing shells, there are various types of securing the position of these partial bearing shells and that it is left freely up to one skilled in the art to choose from among various securing elements or fixing means.

The foregoing relates to preferred exemplary embodiments of the invention, it being understood that other variants and embodiments thereof are possible within the spirit and scope of the invention, the latter being defined by the appended claims.

What is claimed is:

1. An elastic bearing of a hydraulic subassembly of a vehicle brake system, wherein the elastic bearing has rubber elastic elements, at least two of said rubber elastic elements are embodied in a form of hollow cylindrical components with essentially horizontal longitudinal axes and are distributed on two opposing sides of the hydraulic subassembly and rest in lower partial bearing shells and are covered over by stationary upper partial bearing shells, wherein the lower partial bearing shells are formed onto two parallel support arms (6) of a bracket that is connected to a vehicle and wherein bearing pins leading from the hydraulic subassembly extend into the rubber elastic elements, the upper partial bearing shells (8, 8a, 8b) are embodied as components that are placed radially onto the at least two rubber elastic elements (13), and in which extensions (24, 25, 24a, 25a, 24b, 25b) of the lower partial bearing shells extend upwardly at least to a level which is the higher than center of the rubber elastic elements, and upon assembly the upper partial bearing shells (8, 8a, 8b) are inserted between these extensions.

2. The elastic bearing of a hydraulic subassembly according to claim 1 in which essentially projection-like fixing means such as detent projections (54, 55, 55b) are formed onto the upper partial bearing shells (8a, 8b) and engage behind detent openings (28a, 57, 58), wherein these detent openings are associated with the support arms (6b, 6c).

3. The elastic bearing of a hydraulic subassembly according to claim 2, in which the upper partial bearing shells (8a, 8b) and their detent projections (55, 55b) are comprised of an essentially band-like metallic spring material.

4. The elastic bearing of a hydraulic subassembly according to claim 3, in which the upper partial bearing shells (8a, 8b) are embodied as components that are curved around the elastic elements (13) and are adjoined by partial sections (50, 51, 50b, 51b) that lead upward and are inserted between the extensions (24a, 25a, 24b, 25b), wherein detent projections (55, 55b) are at least indirectly associated with these partial sections and wherein detent openings (28a, 58) associated with these detent projections are associated with the support arms (6b, 6c) in at least an indirectly rigid manner.

5. The elastic bearing of a hydraulic subassembly according to claim 1, in which the pins (14) are embodied with heads (41) in the form of countersunk screw heads and the rubber elastic elements (13) are adapted to the heads (41).

6. The elastic bearing of a hydraulic subassembly according to claim 2, in which the pins (14) are embodied with heads (41) in the form of countersunk screw heads and the rubber elastic elements (13) are adapted to the heads (41).

7. The elastic bearing of a hydraulic subassembly according to claim 3, in which the pins (14) are embodied with heads (41) in the form of countersunk screw heads and the rubber elastic elements (13) are adapted to the heads (41).

8. The elastic bearing of a hydraulic subassembly according to claim 5, in which the pins (14) are embodied with heads (41) in the form of countersunk screw heads and the rubber elastic elements (13) are adapted to the heads (41).

9. The elastic bearing of a hydraulic subassembly according to claim 1, in which essentially projection-like fixing means such as detent projections (54, 55, 55b) are formed onto the upper partial bearing shells (8a, 8b) and engage behind detent openings (28a, 57, 58), wherein these detent openings are associated with the support arms (6b, 6c).

10. The elastic bearing of a hydraulic subassembly according to claim 1, in which the partial bearing shells (8) are shorter than the outer diameter of the rubber-like elements (13) and that brackets (32, 32a) lead from the upper partial bearing shells (8) and are embodied of one piece with them, and when mounted, these brackets engage around lower partial bearing shells (7) and for mounting, are pivoted over and under the lower partial bearing shells (7).

11. The elastic bearing of a hydraulic subassembly according to claim 10, in which the pins (14) are embodied with heads (41) in the form of countersunk screw heads and the rubber elastic elements (13) are adapted to the heads (41).

12. An elastic bearing of a hydraulic subassembly of a vehicle brake system, wherein the elastic bearing has rubber elastic elements, at least two of said rubber elastic elements are embodied in a form of hollow cylindrical components with essentially horizontal longitudinal axes and are distributed on two opposing sides of the hydraulic subassembly and rest in lower partial bearing shells and are covered over by stationary upper partial bearing shells, wherein the lower partial bearing shells are formed onto two parallel support arms (6) of a bracket that is connected to a vehicle and wherein bearing pins leading from the hydraulic subassembly extend into the rubber elastic elements, the upper partial bearing shells (8, 8a, 8b) are embodied as components that are placed essentially radially onto the at least two rubber elastic elements (13), in which detent means (54, 55, 55b) are formed onto the upper partial bearing shells (8a, 8b) and engage behind detent openings (28a, 57, 58), wherein these detent openings are associated with the support arms (6b, 6c) and the upper partial bearing shells (8a, 8b) and their detent projections (55, 55b) are comprised of an essentially band-like metallic spring material and are embodied as components that are curved around the elastic elements (13) and are adjoined by partial sections (50, 51, 50b, 51b) that lead upward and are inserted between the extensions (24a, 25a, 24b, 25b), wherein detent projections (55, 55b) are at least indirectly associated with these partial sections and wherein detent openings (28a, 58) associated with these detent projections are associated with the support arms (6b, 6c) in at least an indirectly rigid manner the detent projections (55, 55b) being produced by forming U-shaped slits and bending them out from partial sections (51, 53, 50b, 51b) that adjoin the upper partial bearing shells (8a, 8b).

13. The elastic bearing of a hydraulic subassembly according to claim 12, in which one end (54) of a partial section (52) is bent in the shape of a hook in order to hook into an opening (57) that is disposed in a flange (56) situated on the support arm (6b).

14. An elastic bearing of a hydraulic subassembly of a vehicle brake system, wherein the elastic bearing has rubber elastic elements, at least two of said rubber elastic elements are embodied in a form of hollow cylindrical components with essentially horizontal longitudinal axes and are distributed on two opposing sides of the hydraulic subassembly and rest in lower partial bearing shells and are covered over by stationary upper partial bearing shells, wherein the lower partial bearing shells are formed onto two parallel support arms (6) of a bracket that is connected to a vehicle and wherein bearing pins leading from the hydraulic subassembly extend into the rubber elastic elements, the upper partial bearing shells (8, 8a, 8b) are embodied as components that are placed essentially radially onto the at least two rubber elastic elements (13) wherein the partial bearing shells (8) are shorter than the outer diameter of the rubber-like elements (13) and that brackets (32, 32a) lead from the upper partial bearing shells (8) and are embodied of one piece with them, and when mounted, these brackets engage around lower partial bearing shells (7) and for mounting, are pivoted over and under the lower partial bearing shells (7).

15. The elastic bearing of a hydraulic subassembly according to claim 14, in which the support arms (6) have flanges (26, 27) that extend at right angles and thereby parallel to the longitudinal axes of the lower partial bearing shells (7), and between themselves, these flanges support the brackets (32) and thereby, resilient tabs (36, 37) that lead from the brackets (32) and have detent projections (38, 39) directed toward the flanges (26, 27), and have detent openings (28) for the detent engagement of the detent projections (38, 39).

16. The elastic bearing of a hydraulic subassembly according to claim 14, in which the bracket (32a) has a detent notch (28a) at a point that is the deepest after the mounting, and that an associated support arm (6a) has a resilient tab (36a) with a detent projection (38a) that can be inserted into the detent notch (28a).

17. The elastic bearing of a hydraulic subassembly according to claim 16, in which the resilient tab (36a) is bent out from the material of the support arm (6a).

18. The elastic bearing of a hydraulic subassembly according to claim 14, in which the bracket (32a) has a detent projection (38b) that is embodied in the form of a resilient tab, is directed counter to the pivot mounting direction, and is associated with a detent stop (60) disposed on the support arm (6d), wherein the resilient detent projection (38b) is equipped in such a way that said resilient detent projection is elastically bent by the detent stop (60) before a final pivot mounting position of the bracket (32a) is reached, and when the final pivot mounting position is reached, springs back and assumes a detent position.

19. An elastic support for a hydraulic subassembly of a vehicle brake system, wherein at least two elastic elements are formed as hollow cylindrical components with essentially horizontal longitudinal axes and are positioned on two opposing sides of the hydraulic subassembly, said at least two elastic elements each rest in a lower support shell and are covered by an upper support shell, wherein a bracket is mounted on the vehicle, the bracket having two parallel arms (6), and the lower support shells are formed as part of the arms of the bracket, both of said lower support shells having extensions (24, 25, 24a, 25a, 24b, 25b), which are directed essentially upwardly, extending upwardly at least to a level which is higher than center of the elastic elements, and upon assembly the upper support shells (8, 8a, 8b) are inserted between these extensions, and wherein bearing pins lead from the hydraulic subassembly and extend into the elastic elements, the upper support shells (8, 8a, 8b) being assembled to the lower support shells after the elastic elements are placed in the lower support shells, the upper support shells being assembled to the lower support shells by being brought from above the lower support shells downwardly into engagement with the elastic elements and at the same time with the lower support shells, the upper support shells and lower support shells having means that inter-engage and hold the upper support shells to the lower support shells, and thus hold the elastic elements between them.

* * * * *

UNITED STATES PATENT AND TRADEMARK OFFICE
CERTIFICATE OF CORRECTION

PATENT NO. : 6,296,236 B1  Page 1 of 1
DATED : October 2, 2001
INVENTOR(S) : Harald Ott It is certified that error appears in the above-identified patent and that said Letters Patent is hereby corrected as shown below:

Title page,
Item [54] should read as follows:
-- [54] ELASTIC BEARING OF A HYDRAULIC SUBASSEMBLY OF A VEHICLE BRAKE SYSTEM --

Signed and Sealed this

Twelfth Day of March, 2002

*Attest:*

*Attesting Officer*

JAMES E. ROGAN
*Director of the United States Patent and Trademark Office*